Feb. 23, 1932. F. J. OVEN 1,846,402

GASKET

Filed Dec. 22, 1930

Inventor:
By Frank J. Oven
Wm. O. Belt Atty

Patented Feb. 23, 1932

1,846,402

UNITED STATES PATENT OFFICE

FRANK J. OVEN, OF CHICAGO, ILLINOIS, ASSIGNOR TO VICTOR MANUFACTURING & GASKET COMPANY, OF CHICAGO, ILLINOIS, A CORPORATION OF ILLINOIS

GASKET

Application filed December 22, 1930. Serial No. 503,987.

This invention relates to gaskets and while it is particularly useful in cylinder head gaskets it can be embodied in manifold and other gaskets with correspondingly satisfactory results.

The primary object of the invention is to reenforce in a novel and efficient manner the marginal edges of the gasket about openings therein, thereby to strengthen the gasket about the openings to protect the marginal edges of the gasket against heat and pressure, to provide an efficient seal, and to prolong the life of the gasket.

Another object of the invention is to form a curled beaded reenforcement on the marginal edge about an opening in a metal layer for a gasket, thereby producing an efficient cushion which will yield to pressure of a joint about the opening therein and the bead having a plurality of contacting convolutions providing a reenforced wall about the opening in the gasket which will protect the gasket against heat and pressure at the opening and prolong the life of the gasket.

And a further object of the invention is to provide a gasket, having top and bottom metal layers and an interposed refractory layer, with an integral curled bead on one metal layer at the marginal edge of the gasket about an opening therein and a flange on the other layer overlapping the curled bead to form a strong, sturdy, substantial but cushionly yielding marginal edge about an opening in the gasket presenting a wall about the opening having a plurality of thicknesses which provide strength to the gasket and resistance against the action of fluids, heat and pressure.

In the accompanying drawings illustrating selected embodiments of the invention

Figs. 3 to 7 inclusive are similar views showing different forms of the invention.

Figure 8:
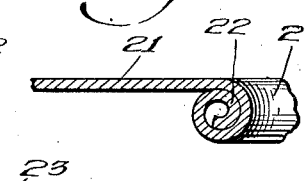

Fig. 8 is a detail sectional view showing a single metal layer gasket.

Figure 9:
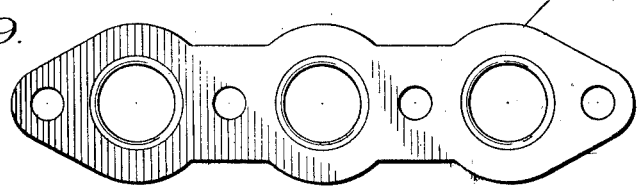

Fig. 9 is a plan view of a manifold gasket.

Figure 2:
Fig. 2 is a detail enlarged sectional view on the line 2—2 of Fig. 1.

The cylinder head gasket 1 illustrated has combustion openings 2, water openings 3 and bolt openings 4. The gasket comprises top and bottom metal layers 5, 6 and an interposed refractory layer 7, Fig. 2. The metal layers may be made of copper, brass or other metal or other suitable material and the refractory layer 7 may be made of asbestos or asbestos composition or other suitable heat-resisting and elastic material. In Fig. 2 the marginal edge of the top layer 5 about the combustion opening 2 is curled compactly upon itself to form a volute or bead 8 which has at least a double wall facing the opening formed by the nesting contacting outer segment 9 and inner segment 10 of the curl. The curl may have additional convolutions which will provide more segments in the wall of the opening, if desired, but for general purposes it will be sufficient to provide the two segments 9 and 10 which are in close contact with each other. The bottom layer 6 is provided with a flange 11 which snugly contacts the segment 9 of the bead 8 and forms therewith a strong and substantial wall of triple thickness about the opening. The marginal edge 12 of the flange 11 is seated against the top layer 5 which is preferably depressed at 13 to receive said marginal edge. The bead is preferably made as snug and tight as possible without fracturing the metal, but there will always be some open space at the center of the bead, the transverse area of which will vary according to the gage of metal, the character of curling and other conditions. While the wall about the opening is thus composed of several compactly nested metal segments which form a strong and substantial and efficient protection against the action of fluids, heat and pressure, the marginal edge of the gasket about the opening constitutes a cushion which may be compressed under pressure applied at the joint to effect a desired seal.

Figure 3:
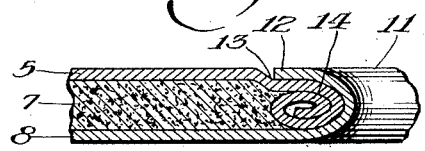
Figure 4:
Figure 5:
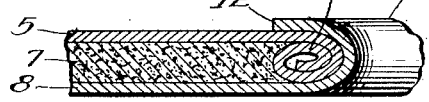
Figure 6:
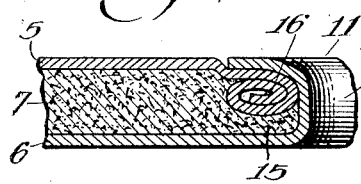
Figure 7:
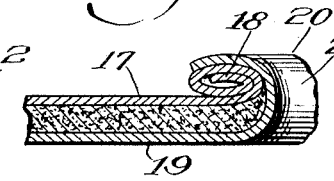

The curled bead 8 of Fig. 2 is of spiral form but the bead may be flattened to an oval form as shown at 14 in Fig. 3. In Figs. 2 and 3 the top metal layer 5 is depressed at 13 to receive the marginal edge 12 of the flange 11 but this depression of the top layer may be omitted and the marginal edge of the flange 11 seated thereon as indicated at 12', Figs. 4 and 5. In Figs. 2 to 5 the refractory layer abuts the curled bead and more or less of the refractory material will be forced in the manufacture of the gasket into the crevices formed by the bead so that the refractory material completely fills the space between the metal layers but is spaced from the opening in the gasket by the bead and the flange. In these forms the bead completely fills the space between the top layer and the bottom layer about the opening. I may project the refractory material beneath the bead as at 15, Fig. 6, in which case the bead may be flattened to an elliptical shape 16 as in Figs. 3 and 5 but of reduced thickness vertically to permit the refractory material to be projected thereunder and abut the flange 11 about the opening 2. I may form the bead as shown in Fig. 7 in which the top metal layer 17 is curled to form a bead 18 on its upper side and the bottom metal layer 19 is provided with a flange 20 which is projected through the opening 2 and is snugly folded over the bead 18. The construction of Fig. 7 is similar to Fig. 6 except that the bead is formed on the upper side of the top metal layer 5 in Fig. 7 and on the under side in Fig. 6.

I may also embody the invention in a single metal layer gasket 21, Fig. 8, by curling the marginal edge about the opening 2 to form a double wall bead 22.

Figure 1:
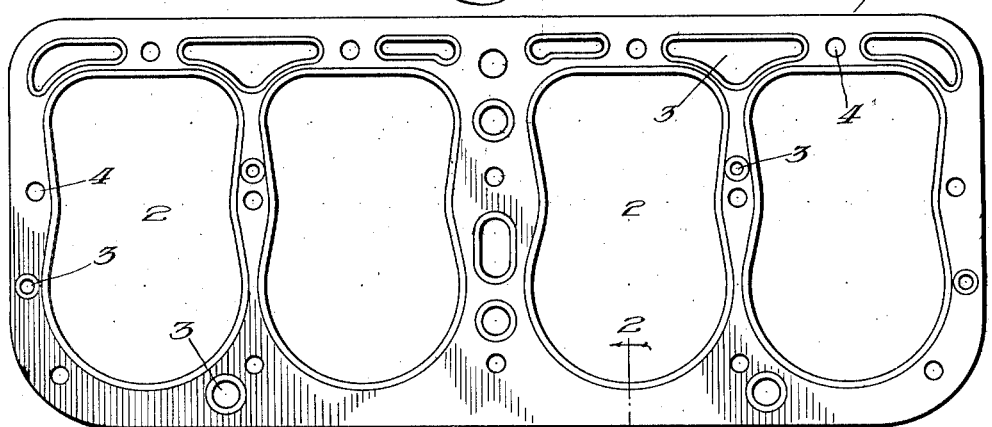
Fig. 1 is a plan view of a cylinder head gasket.

I have shown and described the invention with reference to a cylinder head gasket but it may be used in a manifold gasket 23 and in any other gasket for which it is or may be adapted. The invention may be used about any or all of the openings in the gasket and it will also be understood that by illustrating the particular form of gasket in Fig. 1 I do not limit the invention thereto but use it simply for explaining the invention.

It is particularly important in high compression engines to provide a strong and substantial but cushionly yieldable wall about the combustion openings in a gasket to resist the effect of heat and pressure, and it is also desirable that the water openings should be similarly protected, because the efficiency and life of a gasket is dependent upon the resistance of the walls about the protected openings. It is well known that a gasket is liable to blow at any time after the wall of a combustion opening is broken by fracture or by wear. My invention provides a protected reenforce which involves no additional parts and which can be easily formed to provide a multiple thickness wall about the opening formed of segments nested snugly one within the other and each supporting the other so as to form a protection of substantial thickness against the action of heat and pressure. The invention is also highly important in protecting water openings in the gasket for reasons above indicated.

I have shown the invention in several selected embodiments suitable for the purpose in the accompanying drawings and I reserve the right to make all such changes in the form, construction and arrangement of parts as may be necessary or desirable to satisfy different conditions in adapting the invention to gaskets of different kinds and types within the scope of the following claims.

I claim:

1. A gasket comprising a metal layer having a marginal edge curled upon itself to form a bead in which the convolutions are compactly wound to be in snug contact one within the other throughout the extent thereof.

2. A gasket comprising a metal layer having a marginal edge spirally curled upon itself to form a bead on one side of the layer, the convolutions of said bead being arranged compactly in snug contact one within the other.

3. A gasket comprising a metal layer having an integral marginal edge bent upon itself and forming an elliptical bead composed of a plurality of segments arranged one within the other and with the surfaces of adjacent segments snugly contacting with each other.

4. A gasket comprising two outer metal layers and a refractory intermediate layer, a marginal edge of one metal layer being curled upon itself to form a bead and a corresponding marginal edge on the other metal layer being flanged and enclosing said bead.

5. A gasket comprising two outer metal layers and a refractory intermediate layer, a marginal edge of one metal layer being curled upon itself to form a spiral bead and a corresponding marginal edge on the other metal layer being flanged and snugly enclosing said bead.

6. A gasket comprising two outer metal layers and a refractory intermediate layer, corresponding marginal edges on said layers being bent and interengaged to form a triple thickness wall of metal at said marginal edge.

7. A gasket comprising top and bottom metal layers and a refractory intermediate layer, a marginal edge on the top layer being curled upon itself on the inner side thereof to form a bead and a corresponding marginal edge on the bottom metal layer being flanged and enclosing said bead.

8. A gasket comprising top and bottom metal layers and a refractory intermediate layer, a marginal edge on one metal layer being curled upon itself to form a bead on the outer edge of said layer and a corresponding marginal edge on the other metal layer being flanged over said bead.

FRANK J. OVEN.